United States Patent [19]

Mascia et al.

[11] 4,120,396
[45] Oct. 17, 1978

[54] REUSABLE CAN CARRIER WITH CAN ENLOCKING MEANS ON OPPOSITE SURFACES

[75] Inventors: Carmen T. Mascia, Clarendon Hills; Gary K. Hasegawa, Chicago, both of Ill.

[73] Assignee: The Continental Group, Inc., New York, N.Y.

[21] Appl. No.: 825,241

[22] Filed: Aug. 16, 1977

[51] Int. Cl.² ............... B65D 85/62; B65D 75/00
[52] U.S. Cl. ............................. 206/151; 206/430; 206/821; 220/23.4; 220/23.6
[58] Field of Search ............ 206/159, 151, 150, 427, 206/430, 504, 821; 220/23.6, 23.8, 23.4; 294/87.2

[56] References Cited

U.S. PATENT DOCUMENTS

| | | | |
|---|---|---|---|
| 2,217,644 | 10/1940 | Conner | 220/23.4 |
| 2,326,414 | 8/1943 | Thompson | 206/821 |
| 3,199,908 | 8/1965 | Poupitch | 206/151 |
| 3,664,497 | 5/1972 | Mascia | 220/23.4 |

Primary Examiner—William T. Dixson, Jr.
Attorney, Agent, or Firm—Charles E. Brown

[57] ABSTRACT

A can carrier which is reusable and is injection molded of plastics material, the can carrier being in the form of a sheet having projecting from opposite surfaces thereof circumferentially spaced arcuate flange segments, each flange segment defining a socket receiving the double seam or chime of a can and interlocking the same with the can carrier. The flange arrangement on opposite sides of the sheet being in alignment with the flange segments on each side of the sheet being aligned with the spaces between flange segments on the opposite sides of the sheet.

10 Claims, 6 Drawing Figures

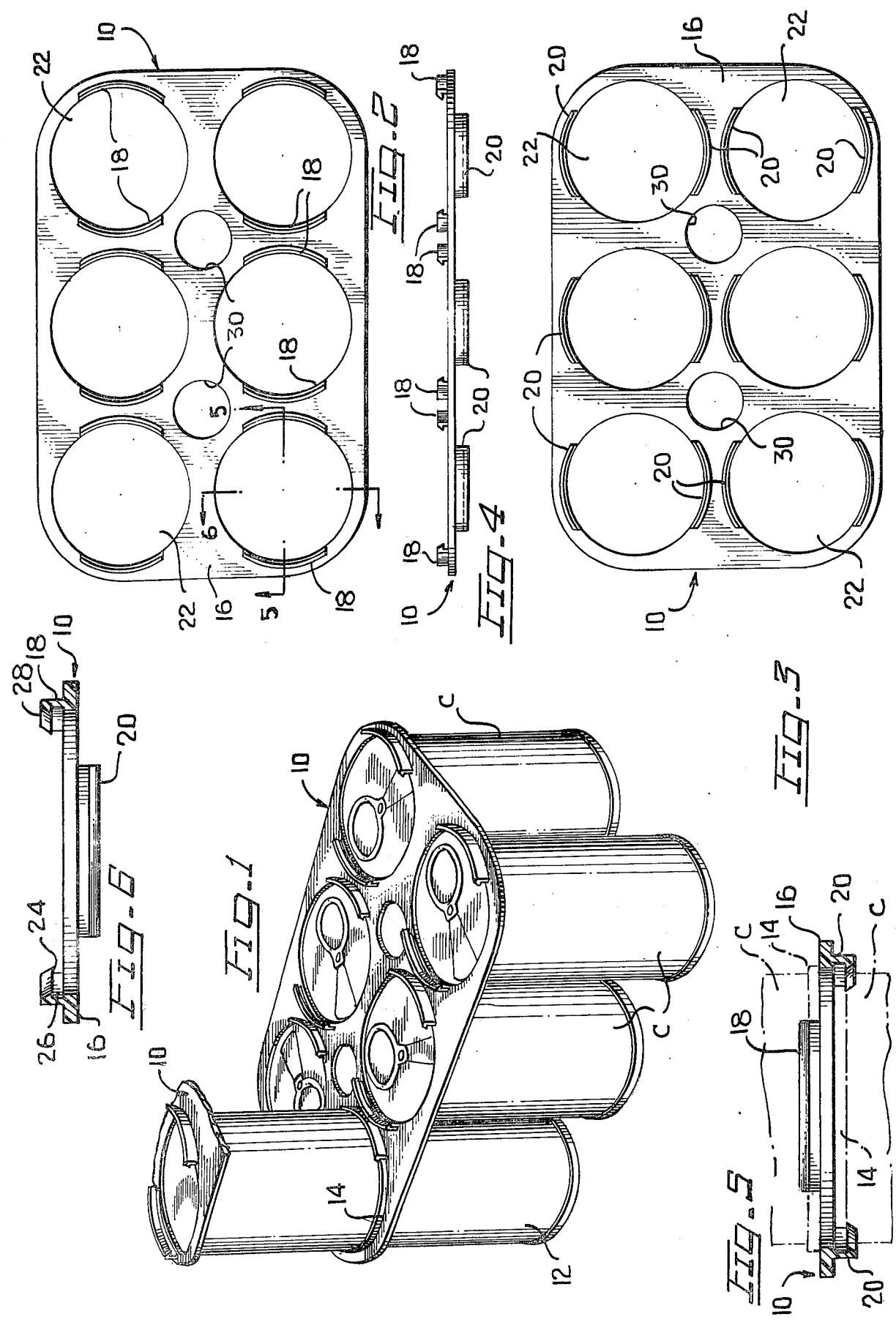

REUSABLE CAN CARRIER WITH CAN ENLOCKING MEANS ON OPPOSITE SURFACES

This invention relates in general to new and useful improvements in container packages, and more particularly to a reusable can carrier.

At the present, beverage cans and the like are normally packaged in suitable packs of six and eight cans with the packages being designed solely for the purpose of conveying the cans to the ultimate user. When the cans are removed from the package, the carrier or wrapping is destroyed so that it no longer remains available for the return of the cans should it be so desired. At the present, it is proposed in certain areas to place a penalty or tax on the sale of cans so that it is desirable that the empty cans be returnable. Thus, it is proposed to provide a can carrier which is reusable not only for the return of empty cans, but also for the sale of filled other cans and the eventual return thereof.

In accordance with this invention, there is provided a reasonable carrier for cans in the form of an injection molded sheet of plastics material having formed on at least one surface thereof a preselected number of can receiving means projecting from that surface. Each can receiving means is in the form of a projecting flange defining a socket for receiving a radial projection carried by an end portion of a can. Such radial projection normally will be in the form of a double seam or chime securing the end unit to the can body.

In accordance with the preferred embodiment of the invention, the can receiving means are formed on the opposite surfaces of the sheet so that two sets of cans may be interlocked with the single carrier. The can receiving means of the opposite surfaces of the sheet are in alignment with each can receiving means being in the form of circumferentially spaced flange segments, the flange segments of a can receiving means on one side of the sheet being aligned with spaces between can segments of can receiving means on the opposite side of the sheet.

With the above, and other objects in view that will hereinafter appear, the nature of the invention will be more clearly understood by reference to the following detailed description, the appended claims and the several views illustrated in the accompanying drawings.

IN THE DRAWINGS

FIG. 1 is a fragmentary top prospective view of cans interlocked with can carriers and in stacked relation in accordance with this invention.

FIG. 2 is a plan view of the can carrier of FIG. 1.

FIG. 3 is a bottom plan view of the can carrier.

FIG. 4 is a side elevational view of the can carrier.

FIG. 5 is an enlarged fragmentary vertical sectional view through the can carrier along the line 5—5 of FIG. 2 showing the relative positions of cans interlocked therewith.

FIG. 6 is an enlarged fragmentary transverse sectional view taken along the line 6—6 of FIG. 2 and shows further details of the means carried by the can carrier for interlocking with projections on conventional can bodies.

Referring now to the drawings in detail, it will be seen that there is illustrated in FIG. 1 a can carrier formed in accordance with this invention, the can carrier being identified by the numeral 10. The can carrier 10 has interlocked therewith a plurality of conventional cans C.

Although the can carrier 10 will function to carry two-piece cans, that is cans which have one end thereof integrally formed with the body, the cans associated with the can carrier 10 are preferably three-piece cans wherein both end units are secured to a can body by a conventional double seam. The can bodies are identified by the numeral 12 while the double seam or resultant chime is identified by the numeral 14. The upper end units of the cans C are illustrated as being of the easy opening type, but the invention is in no way so limited.

It will be readily apparent from the drawings that the can carrier 10 is in the form of an injection molded plastics material sheet 16 which has projecting from the opposite surfaces thereof can receiving means in the form of arcuate flange segments 18 and 20, the flange segments 18 being formed on one surface of the sheet 16 and the flange segments 20 being formed on the opposite surface of the sheet 16.

It is to be noted that the can carrier 10 is particularly configurated for receiving cans arranged in rows and columns with there being six cans securable to each surface thereof. The sheet 16 has formed therein an opening 22 aligned with each intended can position. The flanges 18 and 20 are disposed concentric to the openings 22 and are spaced slightly outwardly thereof, as is best shown in FIG. 6. It is to be noted from FIG. 6 that each flange 18, 20 includes an inwardly projecting lip 24 which is in opposed relation and spaced from the adjacent portion of the sheet 16. The lip 24, together with the flange 18 or 20 and the sheet 16 define a socket 26 for receiving the double seam or chime 14 of a can C.

It is also pointed out here that the lip 24 has a frusto-conical inner surface 28 with this surface having a larger dimension remote from the sheet 16 so as to facilitate entry of a can radial projection, such as the double seam or chime 14 into the socket 26.

It is to be particularly noted that the segments 18, 20 have circumferentially extending spacers therebetween which are at least as great in extent as the arcuate extent of the flanges 18, 20. Further, it is to be noted that the flanges 18, 20 of aligned can receiving means are out of phase. That is, the flange segments 18 are aligned with the spaces between the flange segments 20 while the flange segments 20 are aligned with the spacers between the flange segments 18.

Normally the can carrier 10 will be utilized to carry but six cans, for example, with the cans being disposed all on one side of the sheet 16. In order to facilitate the carrying of the can package, including the carrier 10 and the six cans in a normal manner, the essential portions of the sheet 16 are provided with finger receiving openings 30.

Referring once again to FIG. 1, it will be seen that can packages formed in accordance with this invention may be readily stacked. Further, it will be seen that the lower ends of the upper cans may be interlocked with the upper side of the lower can carrier 10. Thus, a 12-pack may be readily formed by taking two 6-packs and placing them in stacked relation and then interlocking the lower ends of the upper cans with the lower can carrier 10 in the manner illustrated in FIG. 1. Then the resultant 12-pack may be readily carried by grasping the upper can carrier 10.

It is to be understood that the can carriers 10 are to be a durable construction. It is also to be understood that the interlock between the cans and the can carrier is such that the can carrier may be applied by machine to a set of cans by merely pressing the can carrier down on the prepositioned can utilizing automatically operating machinery. It is further to be understood that the cans may be released from the can carrier 10 without damaging the can carrier or the cans by a twisting action. Further, the empty cans may be replaced in interlocking relation with the can carrier 10 by snapping engagement. First the empty cans may in association with the can carrier 10 form a 6-pack for the purpose of returning the empty cans. Further, because of the stacking relation of the can packs, it will be seen that a large number of 6-packs of empty cans may be stacked and interlocked so that a person may carry 24, for example, cans back at a time with ease.

It is also to be understood that the returned empty cans may be stripped from the can carrier 10 and the can carrier reused with other filled cans in the same manner. The sheet 16 will be formed of sufficient thickness so as to prevent abnormal deterioration and the plastics material will be of sufficient resiliency so as to permit the formation of the flanges 18, 20 of sufficient thickness so that they may be repeatedly flexed for receiving and releasing cans in the continued use of the can carriers 10.

Although only a preferred embodiment of the can carrier has been specifically illustrated and described here, it is to be understood that minor variations may be made in the can carrier without departing from the spirit and the scope of the invention, as defined by the appended claims.

What is claimed as new is:

1. A new article of manufacture comprising a reusable carrier for cans in the form of a sheet of plastics material having opposing surfaces, said sheet having a preselected number of can receiving means projecting from each of said surfaces, each can receiving means of one of said surfaces being in alignment with a corresponding can receiving means of the other of said surfaces, each can receiving means being in the form of a projecting flange cooperating with a portion of said sheet to define a socket for receiving a radial projection carried by an end portion of a can, said flange being interrupted by spaces to form circumferentially spaced arcuate segments, and the flange segments of each can retaining means of said one surface being out of phase with the flange segments of the corresponding can receiving means of said other surface.

2. The article of claim 1 wherein each flange segment includes a radially inwardly directed retaining lip remote from and generally opposing said sheet.

3. The article of claim 2 wherein said lip has frusto-conical inner surface having a larger dimension remote from said sheet and forming means facilitating entry of a can radial projection into said socket.

4. The article of claim 1 wherein each flange segment includes a radially inwardly directed retaining lip remote from and generally opposing said sheet, said lip has frusto-conical inner surface having a larger dimension remote from said sheet and forming means facilitating entry of a can radial projection into said socket.

5. The article of claim 1 together with an opening through said sheet aligned with each can receiving means, said opening being of a dimension less than said socket.

6. The article of claim 5 wherein each flange segment includes a radially inwardly directed retaining lip remote from and generally opposing said sheet.

7. The article of claim 1 wherein there are finger receiving openings in said sheet in centered relation relative to said can receiving means.

8. The article of claim 1 wherein said carrier is of an injection molded construction.

9. The article of claim 1 wherein each flange segment is aligned with a corresponding space on an opposing surface.

10. The article of claim 9 wherein each space is at least as great in extent as the arcuate extent of said opposing flange.

* * * * *